US007544225B2

(12) United States Patent
Reymann et al.

(10) Patent No.: US 7,544,225 B2
(45) Date of Patent: Jun. 9, 2009

(54) DEVICE FOR FILTERING A GAS FLOWING THROUGH A LINE

(75) Inventors: Klaus Reymann, Gerlingen (DE); Uwe Konzelmann, Asperg (DE); Christoph Gmelin, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 394 days.

(21) Appl. No.: 10/952,595

(22) Filed: Sep. 29, 2004

(65) Prior Publication Data

US 2005/0086917 A1 Apr. 28, 2005

(30) Foreign Application Priority Data

Oct. 24, 2003 (DE) ................................ 103 49 632

(51) Int. Cl.
*B01D 46/00* (2006.01)
*F02M 35/02* (2006.01)
*F02M 35/04* (2006.01)

(52) U.S. Cl. .......................... 55/385.3; 55/320; 55/486; 55/487; 55/488; 55/489; 55/523; 55/418; 55/419; 55/410; 55/413; 55/414; 55/416; 55/DIG. 30; 60/295; 60/297; 60/311; 123/198 E

(58) Field of Classification Search ................ 55/385.3, 55/320, 486, 487, 488, 489, DIG. 30, 523, 55/418, 419, 410, 413, 414, 416; 123/198 E; 60/311, 295, 297
See application file for complete search history.

(56) References Cited

U.S. PATENT DOCUMENTS 1,439,151 A * 12/1922 Dailey et al. .................. 96/135
1,499,864 A 7/1924 Gordon
2,193,116 A * 3/1940 Smith .......................... 96/386
2,980,203 A * 4/1961 Lutke ........................ 55/418.1
3,018,841 A * 1/1962 Gerlich ....................... 181/258
3,380,553 A * 4/1968 Gibel ......................... 181/230
3,496,945 A * 2/1970 Tomkin ...................... 131/336
3,527,235 A * 9/1970 Fidelman .................... 131/344
3,733,898 A * 5/1973 Yamamoto et al. ............ 73/198
4,595,401 A * 6/1986 Witchell .................... 55/385.3
4,659,348 A * 4/1987 Mayer ......................... 55/320
5,368,621 A 11/1994 Pool
6,584,768 B1 * 7/2003 Hecker et al. ................. 60/297
6,712,869 B2 * 3/2004 Cheng et al. .................. 55/418
6,887,294 B2 * 5/2005 Kanematsu .................. 55/418
2001/0010153 A1 * 8/2001 Setoguchi et al. ............. 60/297
2002/0029549 A1 * 3/2002 Baumann et al. ........... 55/385.3
2003/0217535 A1 * 11/2003 Kanematsu .................. 55/418

(Continued)

FOREIGN PATENT DOCUMENTS

WO WO 2000/50152 8/2000

*Primary Examiner*—Duane Smith
*Assistant Examiner*—Minh-Chau T. Pham
(74) *Attorney, Agent, or Firm*—Kenyon & Kenyon LLP

(57) ABSTRACT

A device for filtering a gas flowing through a line, particularly for filtering the air flow in an intake line of an internal combustion engine, including a filter element which is insertable in a line section and surrounds a longitudinally extending interior cavity in the manner of a cover. In order to equalize the flow of gas, a choke element is furnished with at least one breakthrough in the interior cavity and divides the inner cavity into two sub-sections that are connected to one another via the at least one breakthrough.

8 Claims, 2 Drawing Sheets

19
10
1
d
14

U.S. PATENT DOCUMENTS

2004/0098957 A1* 5/2004 Yoo et al. ..................... 55/410
2004/0139734 A1* 7/2004 Schmeichel et al. ........... 60/283
2004/0168418 A1* 9/2004 Jha et al. ...................... 55/486
2005/0076623 A1* 4/2005 Stenersen et al. .......... 55/350.1
2005/0235615 A1* 10/2005 Nyman et al. .............. 55/350.1
2005/0284292 A1* 12/2005 Ruan ........................... 95/226

* cited by examiner 19
10
1
d
14

1
2
3
21
22

DEVICE FOR FILTERING A GAS FLOWING THROUGH A LINE

FIELD OF THE INVENTION

The present invention relates to a device for filtering a gas flowing through a line, particularly for filtering the air flow in an intake line of an internal combustion engine.

BACKGROUND INFORMATION

In order to filter the air flowing through an intake line of an internal combustion engine of a motor vehicle, it is known to use filter elements which are inserted in an air filter box mounted in the intake line. The air filter elements are constructed essentially as hollow cylinders with a continuous interior cavity. The filter box is constructed such that the air flows laterally against the outer cover of the filter element, passes through the air-permeable filter element, and escapes to the filter box outlet through the interior cavity. A further line section is connected downstream from the filter box outlet, in which, for example, an air-flow meter is fitted.

However, the lateral direction of the air at the outer cover of the filter element causes a highly uneven air flow through the filter element, which varies according to construction. Experience has shown that most of the air charged with dust and other particles flows through a section of the filter element facing away from the filter box outlet, causing this section to become heavily clogged over time, so that the air then flows through other parts of the filter element. Because of the uneven flow through the filter element, a highly asymmetrical flow profile forms initially in the interior cavity, which then changes significantly over time. This asymmetrical flow profile, which changes over time, is transferred in the main direction of flow to the line section fitted with the air-flow meter and connected to the filter box outlet. The change in the flow profile causes a disadvantageous drift of the sensor characteristic curve of a sensor element situated in the air-flow meter.

SUMMARY OF THE INVENTION

The device according to the present invention includes in the interior cavity of the filter element a choking element which has at least one breakthrough and divides the interior cavity into two sub-sections which are connected with each other via the at least one breakthrough. Air that reaches the interior cavity via the section of the filter element facing away from the filter box outlet and the filter element flows from the first sub-section through the at least one breakthrough and into the second sub-section, and from there to the filter box outlet. The air flow through the first sub-section is thus throttled, which causes a greater portion of the air to pass into the sub-section of the interior cavity facing the outlet via the outer cover of the filter element. In this way, the air flow in the interior cavity of the filter element is advantageously rendered more uniform and deposits form more evenly on the filter element over time.

Moreover, the at least one breakthrough causes turbulence in the air flow, thereby improving the exchange of impulses between zones with higher and lower flow speeds. Overall, this results in a more uniform flow, not only in the longitudinal direction of the hollow cylindrical filter element, but also radially to the main center axis of the filter element. The choke element in the interior cavity of the filter element thus assures more even soiling of the filter element and also prevents significant drift of the characteristic curve of an air-flow meter fitted downstream from the filter element.

The choke element may be in the shape of a disk, made of metal, for example, and may lie flush with a peripheral surface of the interior wall of the filter element.

The choke element is preferably fitted approximately halfway along the length of the interior cavity and divides the interior cavity into two approximately equal sub-sections.

In a preferred exemplary embodiment, the choke element includes a plurality of breakthroughs, which may, for example, have the form of boreholes in the disk-shaped element. The boreholes are created in the choke element preferably parallel to the longitudinal plane of the interior cavity. The diameter of the breakthroughs is preferably at least four times smaller than the diameter of the disk-shaped choke element.

Because the outermost breakthroughs overlap with the outer periphery of the choke element so as to lend the outer periphery a zigzag contour, the choke element may be secured easily to the interior wall of the filter element.

DETAILED DESCRIPTION

Figure 1:
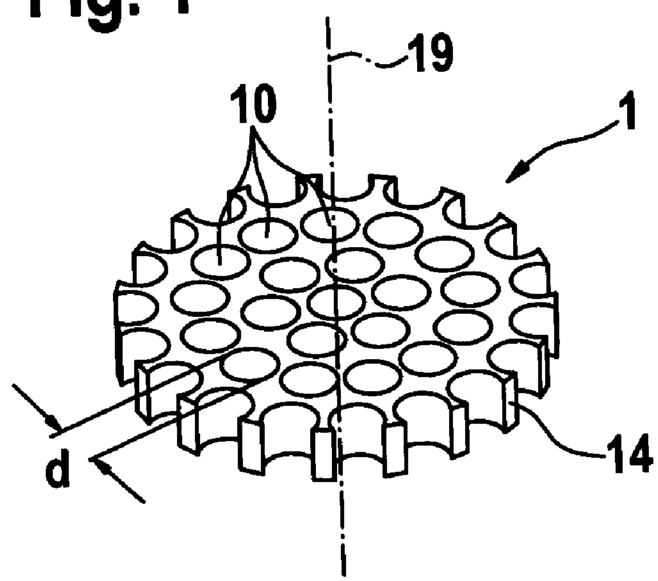
FIG. 1 shows a perspective view of the choke element.
Figure 2:
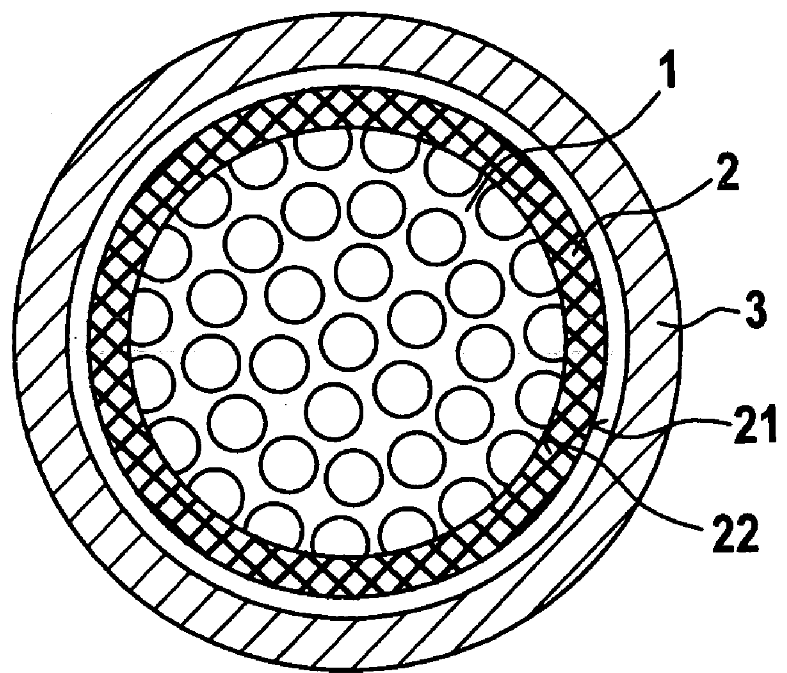
FIG. 2 shows a cross section of a line section having a filter element mounted therein and the choke element.
Figure 3:
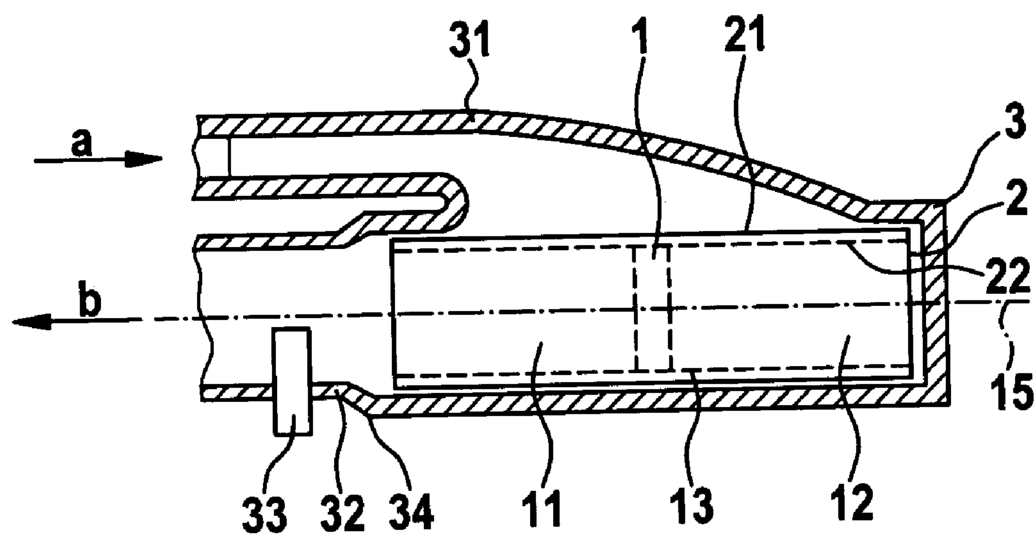
FIG. 3 schematically shows part of the intake line of an internal combustion engine fitted with the device for filtering intake air.

Although the present invention is not limited to devices used in motor vehicles for filtering intake air in an internal combustion engine, it will be described with reference to an exemplary intake duct of an internal combustion engine as shown in FIGS. 1 through 3. However, the device is generally suitable for use in filtering gases in lines.

FIG. 3 schematically shows a cutout of the intake line of an internal combustion engine. The aspirated air is passed from the outer chamber in arrow direction a through feed line 31 to an essentially cylindrically constructed filter box 3. The air passes laterally into the filter box. Filter box 3 contains an essentially hollow-cylindrical filter element 2 known per se, which includes an outer wall 21 and an inner wall 22, and surrounds a continuous interior cavity 13 extending in a longitudinal direction along a longitudinal axis 15. However, filter element 2 may also be conical or have an oval cross section or be angular. In the filter box, the air is divided around outer wall 21 of filter element 2, passes through this and thus passes into interior cavity 13. Such filter devices are known as drum air filters. From interior cavity 13, the air passes in a main flow direction along longitudinal axis 15 in the direction of arrow b in FIG. 3 to a further line section 32, in which an air-flow meter 33, for example a hot film air mass meter, is situated. From there, the air passes into the combustion chamber of the internal combustion engine, not shown in the drawing.

As is shown in FIG. 3, the device according to the present invention for filtering the gas flow includes a choke element 1, which is mounted in interior cavity 13 of filter element 2. Choke element 1 is shown in FIG. 1 and has a disk-like construction. Choke element 1 may be made, for example, of metal or plastic. Main axis 19 of disk-shaped choke element 1 is positioned parallel to longitudinal axis 15 of the filter element, as is apparent in FIG. 2. Choke element 1 is furnished with a large number of breakthroughs (openings) 10, which may be formed as boreholes and extend through disk-shaped choke element 1, parallel to main axis 19. The outermost breakthroughs may also overlap outer periphery 13 of the choke element to lend a zigzag shape to the contour. The diameter of breakthroughs 10 is preferably more than four times smaller than the diameter of choke element 1. In a preferred exemplary embodiment, the diameter of the breakthroughs is about 9 mm, for example, the thickness of the choke element is, for example, about 10 mm, and the diameter of the choke element is, for example, about 52 mm. The throttling behavior of choke element 1 may be determined by suitable selection not only of the diameter of breakthroughs 10 but also of the number of breakthroughs. This choice also affects the turbulences that arise downstream from the breakthroughs.

FIG. 3 further shows that choke element 1 is mounted in the filter element approximately halfway along the length of interior cavity 13, such that the interior cavity is divided into a first sub-section 12 and a second sub-section 11, which are connected with one another by breakthroughs 10. The two sub-sections are preferably of about equal size. Thus, the air flowing in arrow direction a into filter box 3 will preferably no longer pass through the rear part of filter element 2 into sub-section 12, since the air from there can only flow towards outlet 34 of filter box 32 through breakthroughs 10, which function as throttle points. Consequently, a greater proportion of the air in the front area of the filter box flows through filter element 2 directly into second sub-section 11. In addition, turbulences are caused at the breakthroughs, which have the effect of equalizing speed differences in the flowing air.

The choke element thus is used both to throttle the air flow in the sub-section of the interior cavity of the filter element facing away from the outlet, and also to create turbulences in the air flow downstream from the breakthroughs. The overall effect is to render the air flow in interior cavity 13 more uniform, which in turn distributes soiling of the filter element more evenly. In this way, a significant drift in the sensor characteristic curve of air-flow meter 33 is prevented.

What is claimed is:

1. A device for filtering a gas flowing through a line, comprising:

a line section;

a longitudinally extending interior cavity;

a hollow air permeable filter element insertable in the line section and surrounding the interior cavity in the manner of a cover; and a choke element furnished with at least one opening and fitted in the interior cavity, the choke element dividing the interior cavity into a first sub-section facing away from an outlet and a second sub-section facing the outlet, which are connected to one another via the at least one opening, wherein the choke element is configured to increase a lateral gas flow into the second sub-section.

2. The device according to claim 1, wherein the device is for filtering an air flow in an intake line of an internal combustion engine.

3. The device according to claim 1, wherein the filter element includes an outer wall and an inner wall and the choke element is in the form of a disk and is flush with a peripheral surface on the inner wall.

4. The device according to claim 1, wherein the choke element is situated about halfway along a length of the interior cavity and divides the interior cavity into two sub-sections of about equal size.

5. The device according to claim 1, wherein the choke element has a plurality of boreholes situated parallel to a longitudinal direction of the interior cavity.

6. The device according to claim 5, wherein the choke element is disk-shaped, and wherein a diameter of the boreholes is at least four times smaller than a diameter of the choke element.

7. The device according to claim 1, wherein the choke element has rotational symmetry about a main axis.

8. The device according to claim 1, wherein the at least one opening includes outermost openings overlapping with an outer periphery of the choke element in such a way that the outer periphery has a zigzag contour.

* * * * *